(12) United States Patent
Williams et al.

(10) Patent No.: US 11,463,587 B1
(45) Date of Patent: Oct. 4, 2022

(54) PREDICTIVE MAPPING FOR ROUTING TELEPHONE CALLS

(71) Applicant: UIPCO, LLC, San Antonio, TX (US)

(72) Inventors: Kristopher Williams, San Antonio, TX (US); Reynaldo Medina, III, San Antonio, TX (US); Mark Anthony Lopez, Helotes, TX (US); Amy Daali, San Antonio, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 121 days.

(21) Appl. No.: 16/808,888

(22) Filed: Mar. 4, 2020

Related U.S. Application Data

(60) Provisional application No. 62/813,376, filed on Mar. 4, 2019.

(51) Int. Cl.
*H04M 3/523* (2006.01)
*H04M 3/42* (2006.01)
*H04M 3/51* (2006.01)

(52) U.S. Cl.
CPC ..... *H04M 3/5233* (2013.01); *H04M 3/42221* (2013.01); *H04M 3/5175* (2013.01); *H04M 3/5183* (2013.01)

(58) Field of Classification Search
CPC ............. H04M 3/5232; H04M 3/5233; H04M 3/42221; H04M 3/5175; H04M 3/5183; G06N 20/00
USPC ...................................................... 379/265.12
See application file for complete search history.

(56) References Cited

U.S. PATENT DOCUMENTS

| | | | | |
|---|---|---|---|---|
| 6,088,441 A * | 7/2000 | Flockhart | ............ | H04M 3/5233 379/265.12 |
| 6,163,607 A * | 12/2000 | Bogart | ................ | H04M 3/5233 379/266.01 |
| 8,036,371 B2 * | 10/2011 | Babine | .................. | G06Q 10/06 379/265.1 |
| 10,395,648 B1 * | 8/2019 | Benkreira | ............ | G06K 9/6263 |
| 2004/0249650 A1 * | 12/2004 | Freedman | .............. | G06Q 30/02 705/7.29 |
| 2005/0071241 A1 * | 3/2005 | Flockhart | ............ | H04M 3/5233 705/26.1 |
| 2010/0058234 A1 * | 3/2010 | Salame | ............... | H04M 3/5237 715/810 |

* cited by examiner

*Primary Examiner* — Ahmad F. Matar
*Assistant Examiner* — Jirapon Intavong
(74) *Attorney, Agent, or Firm* — Perkins Coie LLP

(57) ABSTRACT

Predictive mapping technology is used to route a telephone call from a user to a customer service representative. The disclosed technology can use any one or more of the following factors to map a telephone call from a user to a customer service representative: (1) a sentiment score based on a topic of conversation; (2) an experience score of the customer service representative with a topic of conversation; and (3) a performance score of the customer service representative in managing a topic of conversation.

20 Claims, 7 Drawing Sheets

Experience Scores

| Employee ID | Topic 1 | Topic 2 | Topic 3 | ... | Topic_n |
|---|---|---|---|---|---|
| CSR1 | 0.8 | 0.5 | 0 | | 0 |
| CSR2 | 0 | 0 | 0.7 | | 0.9 |
| CSR3 | 0.2 | 0.3 | 0.8 | | 0.7 |
| . | . | . | . | . | . |
| . | . | . | . | . | . |
| CSR_n | 0.5 | 0.6 | 0.3 | | 0 |

Experience Scores

| Employee ID | Topic 1 | Topic 2 | Topic 3 | ... | Topic_n |
|---|---|---|---|---|---|
| CSR1 | 0.8 | 0.5 | 0 | | 0 |
| CSR2 | 0 | 0 | 0.7 | | 0.9 |
| CSR3 | 0.2 | 0.3 | 0.8 | | 0.7 |
| . | . | . | . | . | . |
| . | . | . | . | . | . |
| CSR_n | 0.5 | 0.6 | 0.3 | | 0 |

*FIG. 2*

Performance Scores

| Employee ID | Topic 1 | Topic 2 | Topic 3 | ... | Topic_n |
|---|---|---|---|---|---|
| CSR1 | 70 | 80 | 10 | | 0 |
| CSR2 | 0 | 0 | 90 | | 70 |
| CSR3 | 0 | 0 | 40 | | 80 |
| . | . | . | . | . | . |
| . | . | . | . | . | . |
| CSR_n | 0 | 65 | 0 | | 0 |

PREDICTIVE MAPPING FOR ROUTING TELEPHONE CALLS

CROSS-REFERENCE TO RELATED APPLICATIONS

This application is a non-provisional of and claims priority to U.S Provisional application Ser. No. 62/813,376, filed on Mar 4, 2019, entitled "PREDICTIVE MAPPING FOR ROUTING TELEPHONE CALLS," which is hereby incorporated by reference in its entirety for all purposes.

TECHNICAL FIELD

This disclosure is directed generally to systems, methods, and apparatus for routing telephone calls.

BACKGROUND

When a person calls an organization's customer service phone number, he or she is routed to a customer service representative. To talk to the customer service process, the call routing system may request the person identify the reason for his or her call. In some cases, the call routing system may provide some options such as dialing a number for an option related to complaints. The call routing system may also request the person to enter some identifying information about him or her, such as a member number or a birthdate. After the person enters the requested information, the call routing system typically routes the person to the next available customer service representative.

BRIEF DESCRIPTION OF THE DRAWINGS

FIG. 2 shows an example of a table that maps topics to customer service representatives' experience.

FIG. 3 shows an example of a table that maps topics to customer service representatives' level of success.

Figure 1:
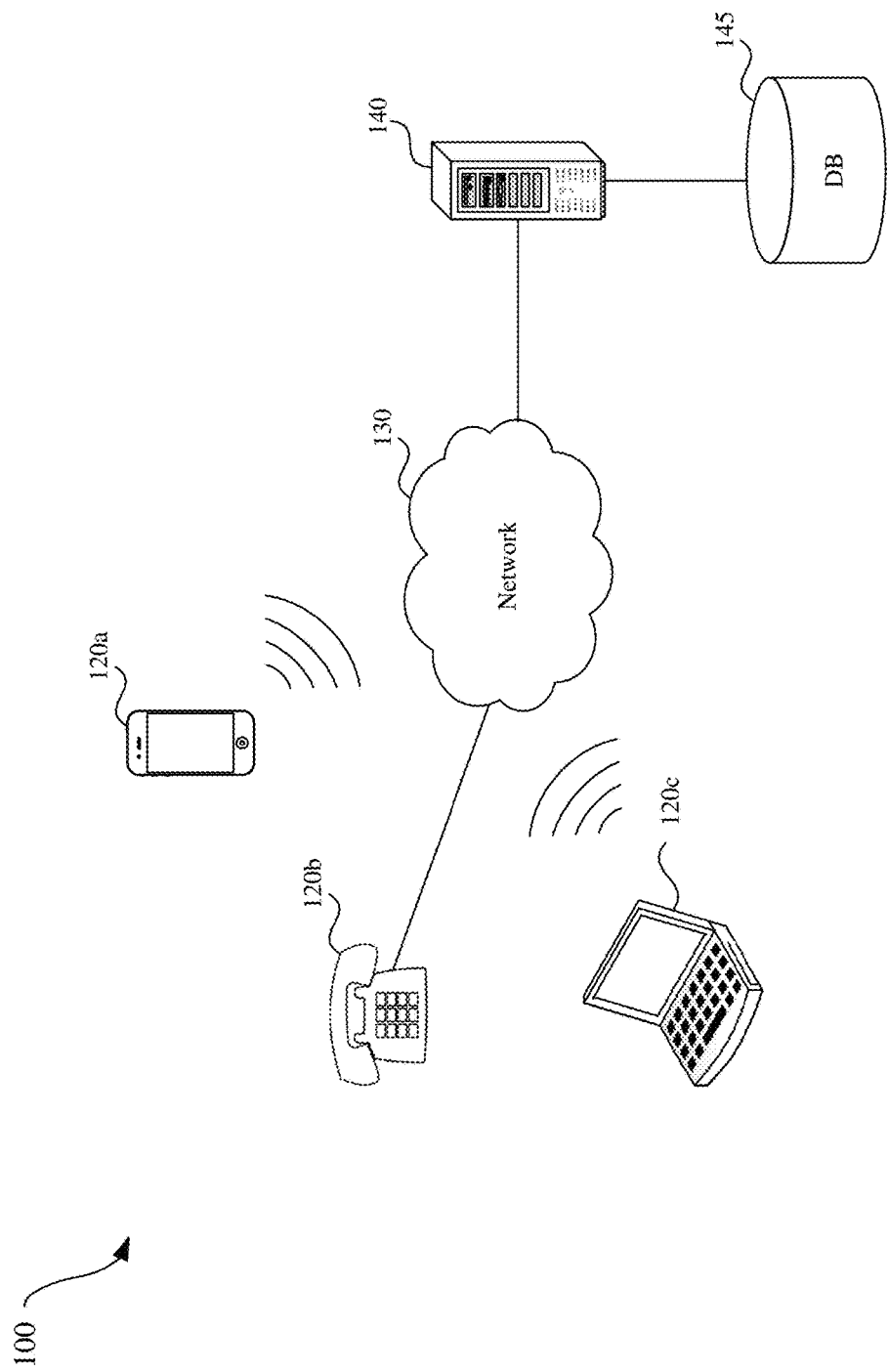
FIG. 1 shows an exemplary telephone call routing system.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

A conventional call routing system can randomly route a person's call to a next available customer service representative based on a reason for the person's call. For instance, the conventional call routing system can request a person to identify a reason for his or her call and can determine that the person is calling about credit card fraud. Based on this reason, the conventional call routing system can randomly select a next available customer service representative within the credit card fraud department to answer the person's call. In some cases, such a random routing may provide a positive outcome for the person, but in some cases, the person may have a negative experience with the randomly selected customer service representative. By randomly routing the call to an available customer service representative, a conventional call routing system cannot predict whether its routing will result a good experience for the person.

To overcome at least some of the issues described above for a conventional call routing system, this patent document describes systems, apparatus, and methods for routing telephone calls based on predictive mapping of a person calling to a customer service representative. The predictive mapping techniques used to map the person to the customer service representative can maximize the likelihood that the person will have a positive experience when talking to the mapped customer service representative. Alternatively, or additionally, the predictive mapping techniques used to map the person to the customer service representative can minimize the likelihood that the person will have a negative experience when talking to the mapped customer service representative. Thus, the technology identifies persons having the optimal personal compatibility for the given scenario to answer the telephone call.

The predictive mapping techniques disclosed herein to identify the persons having optimal personal compatibility to answer the call can be based on any one or more of the following factors: (1) a sentiment score based on a topic of conversation (also known as topic modeling); (2) an experience score of the customer service representative with a topic of conversation; and (3) a performance score of the customer service representative in managing a topic of conversation. These factors and the predictive mapping using each of these factors are described in the sections below. The example headings for the various sections below are used to facilitate the understanding of the disclosed subject matter and do not limit the scope of the claimed subject matter in any way. Accordingly, one or more features of one section can be combined with one or more features of another section.

I. Sentiment Scores for Topics or Topic Modeling

FIG. 1 shows an example of a telephone call routing system 100 that includes user devices 120a-120c that can call a telephone number to talk to customer service representatives at a customer call center. The telephone calls from the user devices 120a-120c can be sent to or can be managed by the call routing server 140. For example, a telephone call initiated by a user device, such as a mobile device 120a, may be sent to a call routing server 140 via a communication network 130. The communication network 130 may include the Internet, a cellular network, a public switched telephone network (PSTN), a voice over Internet Protocol (VOIP) network, or any combination thereof. The call routing server 140 can include or can be connected to a database 145 that can store a plurality of topics that may be organized according to a number of categories relevant to the users calling the customer call center. In an example banking use case, the topics may be organized according to (1) credit card, (2) insurance, (3) loans, (4) account status, etc., The call routing server 140 can develop analytical models to identify a sentiment score associated with each topic in the plurality of topics. A sentiment score for a topic can be used to characterizes a sentiment (e.g., positive, negative, neutral) associated with that topic. The call routing server 140 or another server may analyze a plurality of prior conversations between users and customer service representatives for each topic to determine sentiment scores to characterize whether the conversations were positive, neutral, or negative. Thus, by obtaining the sentiment scores for the plurality of topics, the call routing server 140 can predict whether a user may have a positive, neutral, or negative experience when he or she calls the customer call center to talk to a customer service representative about an issue related to a certain topic.

In some embodiments, an analytical model used to analyze the prior conversations between users and customer service representatives for each topic can include an amount of time that users spoke with customer service representatives, volume of the conversations, words used in the conversations (e.g., "fault" or "thanks" or "manager"), intonation, or any combination thereof. In some implementations, portions (e.g., sentences) can be analyzed to determine a sentiment of the particular portion and given more or less weight depending on a timing of the sentence (e.g., more weight given to sentences at the end of the conversation). Some example implementations for such analytical models are described below.

In some embodiments, a sentiment score may be calculated by utilizing a process that scores each sentence on a positive, or neutral basis based on training data where there are scored sentences from previous conversations. Each "micro score" associated with each sentence can be used to not only create an overall score but may also be analyzed to score the topic of conversation and to assess a sentiment score based on a topic. In some embodiments of the sentiment scoring may include analyzing the micro scores with time and assessing patterns related to signal to noise ratio of sentiment scores. The process of highlighting signal to noise ratio may use known mathematical technique related to frequency spectrum analysis through the use of Fourier and wavelet transformations.

An example analytical model may analyze the amount of time that users speak with customer service representatives at least because such a model is designed to correlate the amount of time that a user speaks to a customer service representative with a sentiment (e.g., positive, neutral, or negative). In some implementations, the analytical model used by a server may assign a negative score (e.g., less than 0.3 out of 1) for a topic if average amount of time of the conversations within that topic is longer than a pre-determined limit or is longer than the average amount of time of conversations associated with another topic. For example, a server can analyze conversations associated with a first topic (e.g., credit card) to determine that an average amount of time that users speak with customer service representatives for the first topic is ten minutes, whereas an analysis of conversations associated with a second topic (e.g., account status) indicates that the average amount of time that users speak with customer service representatives for the second topic is two minutes. Based on this analysis, the server can assign a first topic a sentiment score of, for example, 0.3 out of 1, and the server can assign the second topic a sentiment score of, for example, 0.7 out of 1. In an example implementation, sentiment score values less than 0.33 can be considered negative sentiment topics, sentiment score values between 0.33 and 0.67 can be considered neutral sentiment topics, and sentiment score values greater than 0.67 can be considered positive sentiment topics.

Some additional examples of analytical models may include models that analyze the volume of the conversations or words used in the conversations at least because such models are designed to correlate the volume, tone, and/or words used in conversations with a positive, neutral, or negative sentiment. For example, a server can analyze conversations associated with a first topic (e.g., credit card) to determine that, on average, users speak with customer service representatives at a decibel level that is higher than the decibel measured for conversations associated with a second topic (e.g., account status). This may indicate that at least some of the users calling regarding the first topic may be frustrated or angry as they speak to customers service representatives.

In another example, a server can analyze conversations associated with a first topic (e.g., credit card) to determine that, on average, users use a number of certain pre-determined words (e.g., "fault," "angry," "worry," or "manager") that may be associated with a negative sentiment, whereas server can analyze conversations associated with a second topic (e.g., account status) to determine that, on average, users use certain pre-determined words (e.g., "deposit," "accounts," "thanks," "helpful") that may be associated with a positive sentiment. This may indicate that conversations associated with the first topic may be associated with a negative sentiment, whereas the conversations associated with the second topic may be associated with a positive sentiment. Based on the analysis from the two examples above, the server can assign a first topic a sentiment score (e.g., 0.2 out of 1) that is lower than the sentiment score (e.g., 0.9 out of 1) for the second topic. A sentiment score can be stored on the database 145 corresponding to each of the stored topics and can be accessed by the call routing server 140.

A benefit of using analytical models to determine sentiment scores is that such scores can be periodically obtained to determine whether a sentiment associated with a topic has changed. For example, due to better training, customer service representatives may be able to improve a sentiment score for a topic.

When a user calls a customer call center, the user may use his or her user device to select a topic so that an indication of the selected topic is sent from the user device via the telephone call to the call routing server 140. In response, the call routing server 140 can obtain the pre-determined sentiment score associated with the selected topic to predict whether the user may have a positive, neutral, or negative experience. As further described below, the call routing server 140 may, based on the obtained sentiment score for selected topic, identify one or more customer service representatives that may be best suited for talking to the user for that topic.

In some embodiments, when the user calls a customer call center, the call routing server 140 may auditorily or visually present a plurality of topics on the user device via the telephone call. There are several ways in which a user may indicate a topic for which he or she is calling. For example, the user may select one of the topics by pressing a number associated with that topic while being connected to the call routing server 140 via the telephone call. In another example, the call routing server 140 may include an interactive voice response system that may allow a user to say the topic that he or she is calling about. In yet another example, the user may speak to a live person and may tell that person of the topic relevant to the user. In another example, the call routing server 140 may determine a topic from a cross-channel activity, such as when user calls from a certain phone number, or from a phone number with a particular extension, or from a webpage or an application executing on a user device on which the user was searching for a particular topic or filling out an online application for a particular product.

II. Experience Scores for Customer Service Representatives

Experience scores indicates a level of training or qualification or predicted performance of each customer service representative in the plurality of topics. By using experience scores for a topic, a call routing server 140 may identify one or more customer service representatives that may be the most qualified to speak with a user about an issue related to that topic. Thus, based on the experience scores and based on an indication of a topic selected via a user device, a call routing server 140 may identify one or more customer service representatives that may be the most qualified to talk to a user on the selected topic. Thus, experience scores provide a beneficial metric to map a user calling about a topic to one or more customer service representatives qualified to handle a conversation related to that topic. The experience scores may be stored in the database 145 and may be accessible to the call routing server 140.

In some embodiments, the experience scores can be determined by a manager who can manually enter a customer service representative's experience scores with the various topics in an employment profile that may be stored on the database 145. In some embodiments, an experience score for a customer service representative may be based on a number of training classes that the customer service representative has attended for a topic. In some embodiments, an experience score for the customer service representative may be based on a number of years of experience that the customer service representative has in managing telephone calls in a topic. In some embodiments, the experience scores for a customer service representative may be periodically updated (e.g., once every six months).

Continuing with the example banking scenario described above, a first customer service representative may have experience scores of 0.8, 0.2, 0.1, and 0.9 (out of 1) for the topics (1) credit card, (2) insurance, (3) loans, (4) account status, respectively. And, another customer service representative may have experience scores of 0.1, 0.4, 0.8, and 0.2 (out of 1), respectively for the four topics described above. From these examples, the call routing server 140 can determine that the first customer service representative has a high level of experience with topics related to credit card and account status, and the second customer service representative has a high level of experience with a topic related to loans. Conversely, the call routing server 140 can determine that the first and the second customer service representatives have a low level of experience with insurance and credit card related topics, respectively. In some implementations, all members trained in a particular area receive the same experience score (i.e., the experience score is binary—either the customer service representative is trained in the area or not).

By obtaining experience scores for customer service representatives for each topic, the call routing server 140 or another server can develop a mapping between the customer service representatives and the plurality of topics as shown in FIG. 2. The mapping table in FIG. 2 shows each customer service representative identified by his or her employee identifier (e.g., CSR1, CSR, 2, etc.,) and associated with experience scores for the various topics. In the example shown in FIG. 2, the maximum experience score may be 1, the minimum experience score may be 0, and any experience score greater than or equal to 0.5 may indicate that a person is qualified to answer calls within that topic. The mapping table may be stored on the database 145 and can be accessed by the call routing server 140.

When a user calls a customer call center and selects a topic via the telephone call, the call routing server 140 can receive an indication of the selected topic and the call routing server 140 can identify one or more customer service representatives having experience in the selected topic to answer the telephone call. For example, if the user selects Topic 3 (shown in FIG. 2), the call routing server 140 may identify the customer service representatives associated with the identifiers CSR2 and CSR3 as the ones that are most qualified to speak to the user. In some embodiments, the call center routing 140 may determine that the one or more customer service representatives are qualified to speak to the user on the selected topic if the experience score for that selected topic is above a pre-determined limit (e.g., 0.5).

III. Performance Scores for Customer Service Representatives

Performance scores characterizes one or more customer service representative's level of success in handling a telephone call in the plurality of topics. By using performance scores for a topic, a call routing server 140 may predict that one or more customer service representatives may be successful in speaking with a user on the selected topic based on prior conversations with other users within the selected topic. Thus, performance scores can be considered historical performance of the customer service representatives with each topic. A call routing server 140 or another server can determine performance scores by analyzing a number of previous telephone calls involving one or more customer service representatives for each topic. Thus, based on the performance scores and based on an indication of a topic selected via a user device, a call routing server 140 may identify one or more customer service representatives that may be considered successful on the selected topic to talk to a user based on prior conversations with other users within the selected topic. The performance scores may be stored in the database 145 and may be accessible to the call routing server 140. In some embodiments, performance scores can be based on qualities of the customer service representative. That is, if customer service representatives with certain qualities (e.g., voice characteristics, demographics) have high success rates with a given topic or member, a customer service representative without the requisite history may nonetheless have a high performance score based on his or her similarities to another customer service representative. Thus, customer service representatives can be segmented based on certain qualities.

In some embodiments, frequency domain analysis with power spectrum analysis can be used to determine the natural strengths of the assessed sentiment scores that can be based on each sentence. In an example process, the scored sentences are ordered by time in a sequence. This allows the example process to use spectral theory to not only look for patterns but also assess how much power exists in the strength of the sentiment signal. In one case, the power of the assessed conversation may show more power in the first 255 sentences for a positive sentiment indicating that the first 255 sentences should be used to train and map a positive sentiment score. Alternatively, or additionally, when analyzing negative sentiment score the power may be in the first 200 sentences, or in mathematical terms, the index of the kth value from 0 to 200, where the first 200 sentences can be used to train negative natural language processing (NLP) sentiment-based scoring. As an example, a conversation can be score and the power of the sentiment signals can be determined using modulation techniques, which can be a tool to analyze frequency.

In some embodiments, a server can determine performance scores by obtaining a number of previous calls for each topic to analyze the one or more customer service representative's speech attributes (e.g., tone, cadence of speech). A server may employ digital signal processing techniques to determine a frequency range or amplitude of a customer service representative voice to determine the speech attribute related to tone. If a first customer service representative's frequency range or amplitude is greater than a first value, then the server may assign a performance score (e.g., 60) to the first customer service representative, and if a second customer service representative's frequency range or amplitude is greater than a second value (higher than a first value), then the server may assign a higher performance score (e.g., 80) to the second customer service representative.

Based on the example analysis described above, a server can develop a performance score for each customer service representatives and for each topic as shown in FIG. 3. FIG. 3 includes a table that provides the performance scores for the same customer service representatives as those described in FIG. 2 with the experience scores. As a result, the performance score related metrics can provide meaningful measure of a customer service representative's performance. For example, taking the metrics for CSR1 from FIGS. 2 and 3, it can be determined that while CSR1 has more experience in conversations associated with Topic 1 (experience score of 0.8) than with Topic 2 (experience score of 0.5), he or she had certain speech attributes that had a higher score for prior conversations associated with Topic 2 (performance score of 80) than with Topic 1 (performance score of 70).

In the example shown in FIG. 3, the maximum performance score may be 100, the minimum experience score may be 0, and any performance score greater than or equal to 40 may indicate that a person is qualified to answer calls within that topic. A server can determine a performance score of 0 for a topic if server analyzes the number of previous telephone calls on that topic and determines that a customer service representative has not had a conversation with a user on that topic. The performance scores table shown in FIG. 3 can be stored in the database 145 and can be accessed by the call routing server 140.

When a user calls a customer call center and selects a topic via the telephone call, the call routing server 140 can receive an indication of the selected topic and the call routing server 140 can identify one or more customer service representatives having a level of success in the selected topic to answer the telephone call. For example, if the user selects Topic 2 (shown in FIG. 3), the call routing server 140 may identify the customer service representatives associated with the identifiers CSR1 and CSR_n as the ones that are most successful in that topic to speak to the user based on prior telephone calls. In some embodiments, the call center routing 140 may determine that the one or more customer service representatives have attributes suited to speak to the user on the selected topic if the performance score for that selected topic is above a pre-determined limit (e.g., 30). Thus, the performance score table can be used by the call routing server 140 to map a user on a telephone call to one or more customer service representative based on a performance score for a topic associated with the user's call.

In FIG. 1, the call routing server 140 can determine one or more customer service representatives with optimal personal compatibility to answer a telephone call from a user for a topic based on experience scores and/or performance scores. In some embodiments, the call routing server may perform an aggregation operation to take into account both the experience scores and the performance scores. For example, if a user selects topic 2 for a conversation, based on the metrics provided in FIGS. 2 and 3, the call routing server 140 may combine the scores (e.g., CSR1 has a combined score of 0.5 +80/100 =1.3, CSR3 has a combined score of 0.3+0/100=0.3, CSR_n has a combined score of 0.6+65/100=1.25, and so on). Based on the aggregated score, the call routing server 140 may determine or identify that CSR 1, CSR3, and CSR_n may be most qualified to answer the telephone call from the user for Topic 2. In some embodiments, the call routing server 140 may aggregate the scores and identify the one or more customer service representative having an aggregate score greater than or equal to a pre-determined limit (e.g., 0.2).

IV. Graphical User Interface (GUI) for Customer Service Representatives

After the call routing server 140 identifies the one or more customer service representatives (e.g., using their employee identifiers), the call routing server 140 may generate and send a message to each computer (not shown in FIG. 1) associated with the identified customer service representative(s). The call routing server 140 may communicate with computer(s) associated with the customer service representatives via the network 130, such as the Internet or Intranet. A message sent to each computer of the identified customer service representative indicates that a telephone call from a user is mapped to that customer service representative. Thus, by receiving the message, the computer associated with the customer service representative can determine that a telephone call has been mapped to that customer service representative.

The content of the message indicates or provides a recommendation for each identified customer service representative to answer the telephone call. The recommendation can be based on (1) the sentiment score for a topic associated with a user's telephone call, (2) the experience score of the customer service representative for that topic, and (3) the performance score of the customer service representative for that topic. In some embodiments, the recommendation can be an overall score that may be obtained by aggregating the sentiment score, experience score, and performance score. The overall score for the recommendation may be a weighted combined score so that one or more scores may be weighted more heavily than the other score(s). In some other embodiments, the recommendation may be based on a color-coded scheme that may be based on the overall score (described above) or any one or more of the sentiment score, experience score, and the performance score. An example color coded scheme is shown in FIG. 4.

Figure 4:
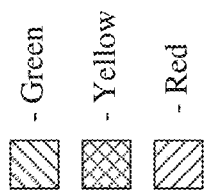
FIG. 4 shows an example of a graphical user interface (GUI) displayed on a customer service representative's computer.

FIG. 4 shows an example of a GUI displayed on a customer service representative's computer. Each row of the GUI is associated with a different caller or user and each column of the GUI provides some information about the caller or user. The Call ID column includes call identifiers that may be a random number automatically generated by the call routing server 140 to identify each caller or user. The GUI may include one or more caller attributes that may be obtained by prompting the user to provide certain information. For example, Caller Attribute 1 may be a user's member number or login information, and Caller Attribute 2 may be a user's location, a military rank, etc., In some embodiments, a customer service representative can select least one telephone call in the displayed list of telephone calls.

The message generated by the call routing server 140 may include a recommendation field that can indicate whether a call is strongly recommended, moderately recommended, or not recommended for a customer service representative. For example, if the call routing server 140 determines that a user has called to address a topic and that a performance score of a customer service representative for that topic is greater than 80, then the message may include information (e.g., Call ID:123 and color code: Green) that indicates to a computer associated with that customer service representative that the customer service representative is strongly recommended to take the telephone call. In another example, if the call routing server 140 determines that a user has called to address a topic and that an overall score (including the experience and performance scores for a customer service representative) is greater than a first pre-determined limit, then the message may include information (e.g., Call ID:246 and color code: Green) that indicates to a computer associated with that customer service representative that the customer service representative is strongly recommended to take the telephone call.

In yet another example, if the call routing server 140 determines that a user has called to address a topic and that an sentiment score for that topic is negative or less than a pre-determined limit, then the message may include information (e.g., Call ID:785 and color code: Yellow) that indicates to a computer associated with that customer service representative that the customer service representative is moderately recommended to take the telephone call. In another example, if the call routing server 140 determines that a user has called to address a topic and that a combination of the experience and performance score for that topic for a customer service representative is less than a pre-determined limit, then the message may include information (e.g., Call ID:356 and color code: Red) that indicates to a computer associated with that customer service representative that the customer service representative is not recommended to take the telephone call.

The one or more customer service representatives can be mapped to a call from a user based on the techniques described in this patent document. Each computer associated with the mapped customer service representative can receive the message, and as shown in FIG. 4, display on a screen a list of telephone calls to be answered by a person. The list of telephone calls includes the telephone call from the user device that is mapped to the customer service representative. Thus, based on the information provided on the customer service representative's computer, the customer service representative may select one or more telephone calls based on an indication of whether a call is recommended for him or her.

In some embodiments, as shown in FIG. 4, the list of telephone calls is organized in an order indicating one or more telephone calls recommended for the person (e.g., Call IDs 1223 to 785) to one or more telephone calls not recommended for the person (e.g., Call IDs 124 to 479). The order can be determined based on experience scores and/or performance scores related to mapping between the customer service representative and topics associated with the list of telephone calls. In some embodiments, the list of telephone calls may be ordered based on a length of time that the users have been waiting on the telephone calls. In such embodiments, a message sent to a computer of a customer service representative may provide a recommendation as to whether that customer service representative is recommended to answer a mapped telephone call from a user. Thus, the list of telephone calls shown in FIG. 4 can be dynamically reorganized based on a recommendation from the call routing server 140. This is a beneficial feature at least because the call routing server 140 can indicate to the customer service representatives telephone calls for which the customer service representative is the most (or least) qualified or the most (or least) successful. In this way, the call routing server 140 can predictively map users calling a customer call center to the appropriate customer service representative(s) that will provide those users will the best or positive experience.

In some embodiments, the exemplary call routing system can assign points of varying values to encourage customer service representatives to answer calls that may be moderately recommended or not recommended for that customer service representative. For example, if a customer service representative answered a call that was strongly recommended for that person, he or she would get 5 points, but if that customer service representative answered calls that were moderately recommended and not recommended for that person or otherwise indicated as difficult, he or she would get 10 and 15 points, respectively. These point values can be tracked or stored on a database to encourage customer service representatives to answer as many calls as possible, not just those that were strongly recommended for him or her. In some embodiments, total points for each customer service representative may be calculated and displayed periodically (e.g., monthly or quarterly) on a computer screen to encourage healthy competition between the customer service representatives. In some implementations, calls are indicated to the representatives as expected to be difficult (e.g., based on the member, sentiment of topic) and customer service representatives can obtain additional points for answering such calls and managing the call such that the call has a calculated positive or neutral sentiment.

As described above, the call routing server 140 can send to a first customer service representative's computer a message that indicates that a telephone call is mapped to the first customer service representative. In some cases, this message may not be sent by the call routing server 140 to a second customer service representative's computer, which indicates that the second customer service representative is not mapped to the telephone call from the user for one or more reasons. For example, if the second customer service representative has an experience score (e.g., 0) for a topic, the call routing server 140 may determine that the second customer service representative is not qualified to handle a call associated with that topic. Thus, in this example, the call routing server 140 may not send a message to the second customer service representative's computer.

In some implementations, the customer service representatives are not privy to the recommendations and are simply provided a list of callers in an order to address. The order can be based on the recommendation even though the customer service representatives cannot see the recommendations. Some of the calls can be listed on more than one customer service representative interfaces and thus the list can change as calls are handled.

V. Random Selection

In some embodiments, if the call routing server 140 determines that a number of calls associated with a topic having negative sentiment score exceeds a limit, then the call routing server may randomly distribute the call among the customer service representatives that are available to take the telephone call, where the random distribution may be regardless of the customer service representatives' experience or performance scores.

For example, a call routing server 140 may receive indications of a topic selected via telephone calls from the user devices. The call routing server 140 can determine that a number of telephone calls having the pre-determined score associated with the selected topic exceeds a pre-determined limit. The call routing server 140 can identify the customer service representatives available to answer the number of telephone calls. In some embodiments, if each customer service representative is supposed to have 5 callers in queue to be considered unavailable, the call routing server 140 may determine the number of available customer service representatives as those having fewer than 5 callers in queue. After the available customer service representatives are identified, the call routing server 140 may randomly distribute the number of telephone calls among the available customer service representatives regardless of the experience score or the performance score. The call routing server 140 may send to the computers associated with the available customer service representatives, messages that indicates that at least one of the telephone calls is mapped to the customer service representatives.

VI. Performance Metrics

The example telephone call routing system 100 can include additional features to provide metrics for a customer service representative's performance. For example, if a customer service representative uses the GUI described in FIG. 4 to select a telephone call to talk to a user, the computer associated with GUI and the customer service representative can record a conversation between the customer service representative and the user. The user would be informed of any recording so that consent may be obtained, or the user may be informed to opt-out of the recording. If the user indicates that he or she does not wish to be recorded, the GUI may have an option not to record the conversation. In cases where the conversation is recorded, the computer sends the conversation to the call routing server 140 for additional analysis.

The call routing server 140, upon receiving the recorded conversation, analyzes it to determine a conversation score based on words used in the conversation, a tone of the conversation, a cadence of the conversation, or an amount of time of the conversation. Techniques to quantifying scores based on an analysis of a speech are described in this patent document. In some embodiments, the conversation score can be determined by analyzing a set of words (e.g., 250 words) from a beginning portion of the recorded conversation. The conversation scores may be scored out of a 100, where a conversation score of 100 indicates that a conversation had attributes that the server considers good or positive, and where a conversation score of 0 indicates that the conversation lacked attributes that the server considers good or positive. Based on the determined conversation score, the call routing server 140 may update a performance score. In some embodiments, the performance score may be updated by replacing the previous performance score with the determined conversation score. In some other embodiments, the performance score may be updated by aggregating (e.g., by averaging) the previous performance score with the determined conversation score.

While a set of words in a conversation includes speech from both a user and a customer service representative, the conversation scores (or other scores) can be determined to quantify whether the analyzed part of the conversation was positive, neutral or negative. In some embodiments, a conversation score from 67 to 100 may be considered positive, a conversation score of 34 to 66 may be considered neutral, and a conversation score of 0 to 33 may be considered negative.

Figure 5:
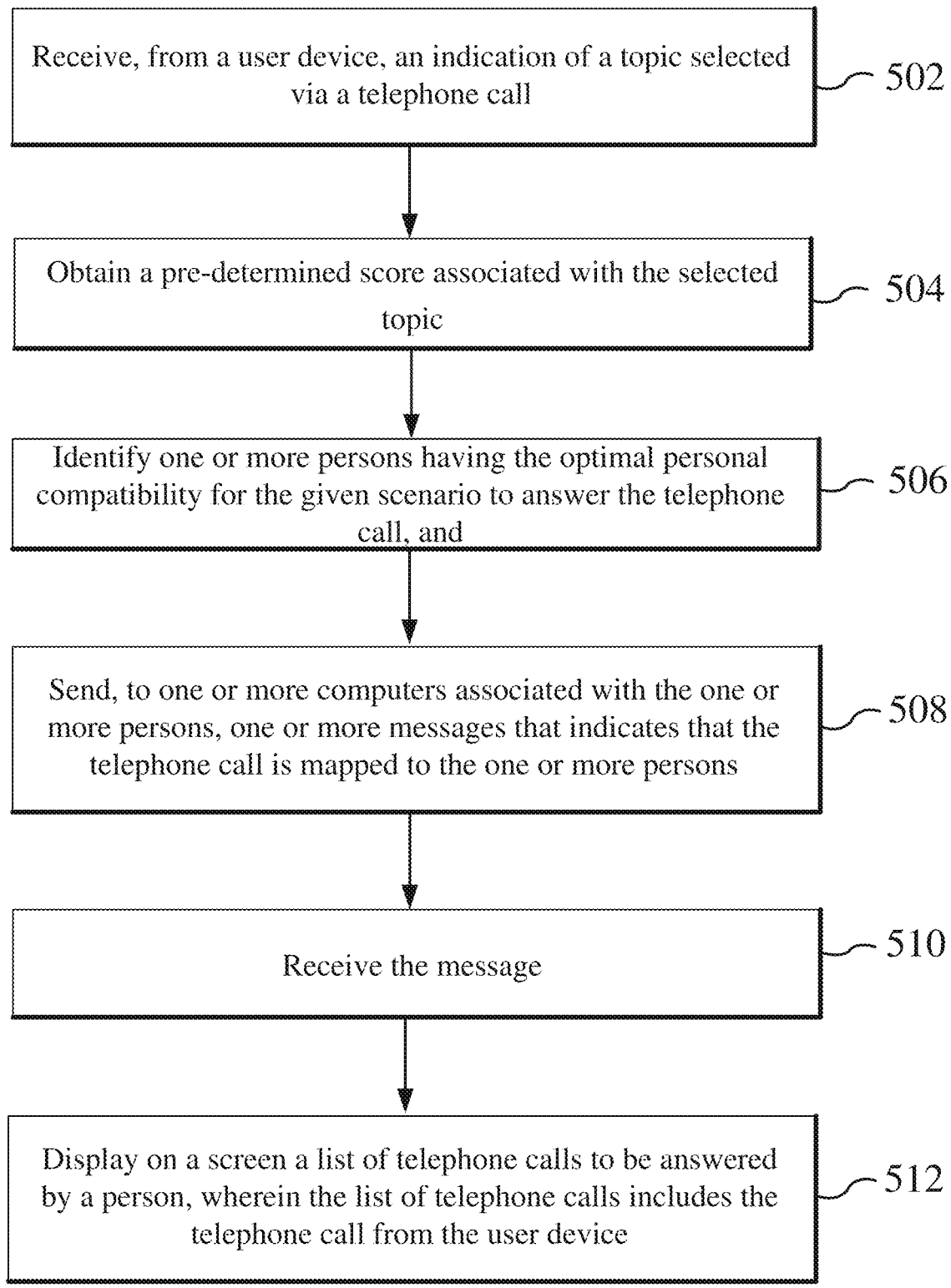
FIG. 5 shows an example flow diagram of a predictive mapping technique for routing a telephone call.

FIG. 5 shows an example flow diagram of a predictive mapping technique for routing a telephone call. Operations 502 to 508 can be performed by a server, such as a call routing server described in this patent document. And, operations 510 to 512 can be performed by each computer of one or more customer service representatives to whom the call is mapped as described in operations 502 to 508.

At the receiving operation 502, a server receives, from a user device, an indication of a topic selected via a telephone call. At the obtaining operation 504, the server obtains a pre-determined score associated with the selected topic, where the pre-determined score characterizes a sentiment associated with the selected topic. The server determines the pre-determined score from a plurality of pre-determined scores associated with a plurality of topics that includes the selected topic.

At the identifying operation 506, the server identifies the one or more persons with optimal personal compatibility to answer the telephone call. The one or more persons are identified based on a mapping between the one or more persons and the plurality of topics. Further, the mapping between each person and at least one topic is based on an experience score that indicates a level of training or qualification or predicted performance of each person in the at least one topic and is based on a performance score that characterizes each person's level of success in handling a telephone call in the at least one topic. In some embodiments, the performance score is determined based on an analysis of each person's speech attributes on a prior telephone call involving the selected topic.

At the sending operation 508, the server sends, to one or more computers associated with the one or more persons, one or more messages that indicates that the telephone call is mapped to the one or more persons. The one or more messages indicate or provides a recommendation for the one or more persons to answer the telephone call based on the pre-determined score, and based on the experience score and the performance score for the mapping between the one or more persons and the selected topic.

At the receiving operation 510, each of the one or more computers receives the message. And, at the displaying operation 512, each of the one or more computers displays on a screen a list of telephone calls to be answered by a person, where the list of telephone calls includes the telephone call from the user device. In some embodiments, at least one telephone call in the displayed list of telephone calls is selectable by the person. In some embodiments, the list of telephone calls is organized in an order indicating one or more telephone calls recommended for the person to one or more telephone calls not recommended for the person, and the order is determined based on experience scores or performance scores related to mapping between the person and topics associated with the list of telephone calls.

In some embodiments, the server (e.g., call routing server 140) is further configured to receive, from additional user devices, indications of the topic selected via a plurality of additional telephone calls; determine that a number of telephone calls having the pre-determined score associated with the selected topic exceeds a limit; identify a plurality of persons available to answer the number of telephone calls, where the number of telephone calls are randomly distributed among the plurality of persons regardless of the experience score or the performance score; and send, to a plurality of computers associated with a plurality of persons, messages that indicates that the telephone call or at least one of the plurality of additional telephone calls is mapped to the plurality of persons.

In some embodiments, at least one computer from the one or more computers is further configured to record a conversation between the person and a user of the user device, and send the conversation to the server. In such embodiments, the server is further configured to: receive and analyze the recorded conversation to determine a conversation score based on words used in the conversation, a tone of the conversation, a cadence of the conversation, or an amount of time of the conversation, and update a performance score for the person based on the conversation score. In some embodiments, the conversation score is determined by analyzing a set of words from a beginning portion of the recorded conversation.

Figure 6A:
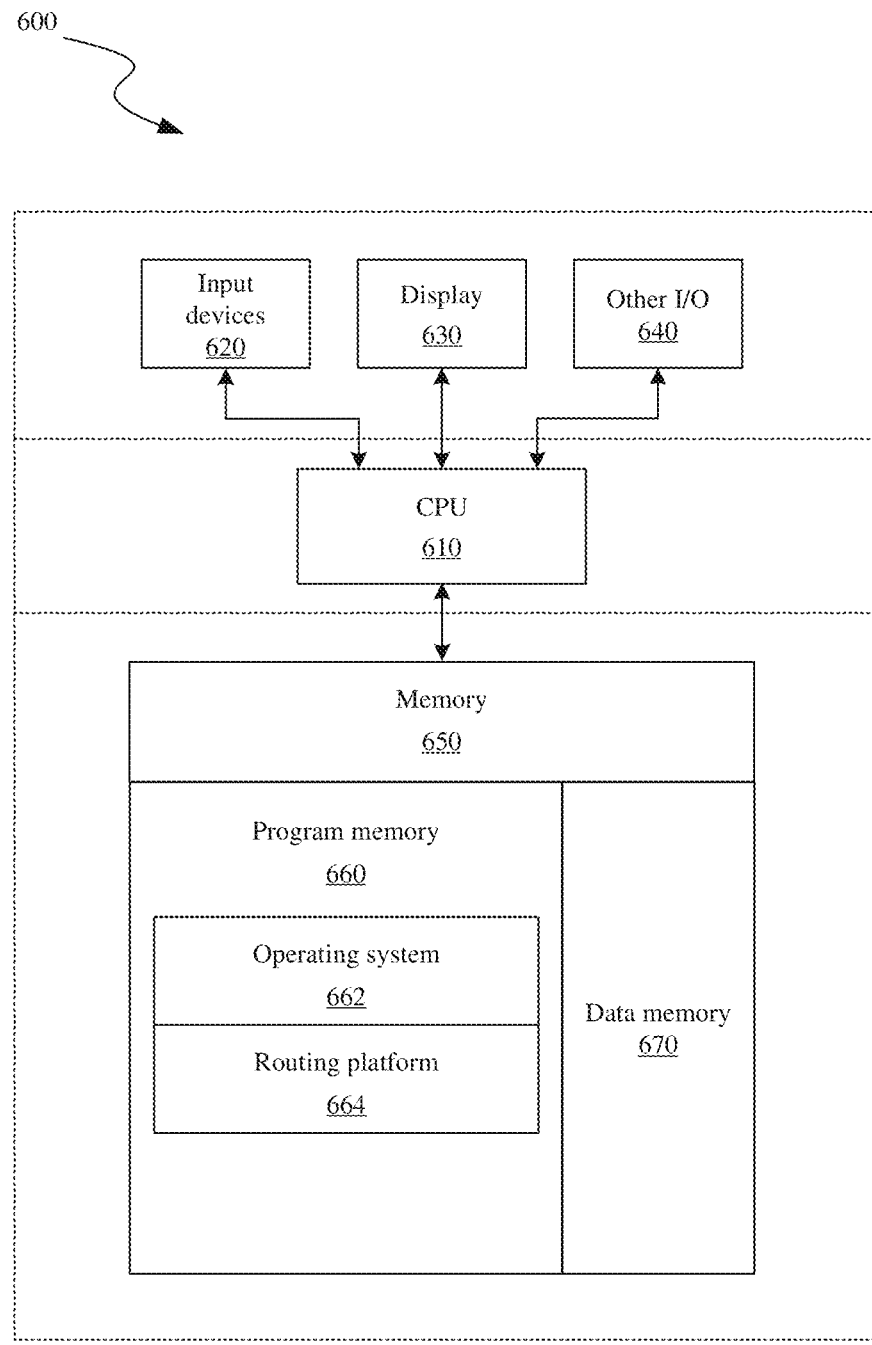
FIGS. 6A-6B are block diagrams illustrating an overview of devices on which some implementations of the disclosed technology can operate.

FIG. 6A is a block diagram illustrating an overview of devices on which some implementations of the call routing server can operate. The devices can comprise hardware components of a device 600, such as the call routing server that includes a routing platform 664 that determines mapping between telephone call(s) from user(s) to customer service representative(s) and that generates and sends message(s) to computer(s) associated with the customer service representative(s). Device 600 can include one or more input devices 620 that provide input to the CPU (processor) 610, notifying it of actions. The actions are typically mediated by a hardware controller that interprets the signals received from the input device and communicates the information to the CPU 610 using a communication protocol. Input devices 620 include, for example, a mouse, a keyboard, a touchscreen, an infrared sensor, a touchpad, a wearable input device, a camera- or image-based input device, a microphone, or other user input devices.

CPU 610 can be a single processing unit or multiple processing units in a device or distributed across multiple devices. CPU 610 can be coupled to other hardware devices, for example, with the use of a bus, such as a PCI bus or SCSI bus. The CPU 610 can communicate with a hardware controller for devices, such as for a display 630. Display 630 can be used to display text and graphics. In some examples, display 630 provides graphical and textual visual feedback to a person operating the device 600. In some implementations, display 630 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 640 can also be coupled to the processor, such as a network card, video card, audio card, USB, FireWire or other external device, camera, printer, speakers, CD-ROM drive, DVD drive, disk drive, or Blu-Ray device.

In some implementations, the device 600 also includes a communication device capable of communicating wirelessly or wire-based with a network node (e.g., a server) or with a user device (e.g., a laptop, desktop, or mobile device) or with one or more computers (e.g., desktop or laptop) associated with the customer service representatives. The communication device can communicate with another device or a server through a network using, for example, TCP/IP protocols. Device 600 can utilize the communication device to distribute operations across multiple network devices.

The CPU 610 can have access to a memory 650. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 650 can include program memory 660 that stores programs and software, such as an operating system 662 and routing platform 664. The routing platform 664 may include processes or methods for routing a telephone call by using the predictive mapping techniques described in Sections I-VI and FIGS. 1-5 of this patent document. Thus, for example, the memory 650 may store instructions that upon execution by CPU 610 configure the device 600 to perform the operations described for the call routing server in FIGS. 1 and 5 and/or in the various embodiments described in this patent document. Memory 650 can also include data memory 670 that can include the various scores described in this patent document, which can be provided to the program memory 660 or any element of the device 600.

Figure 6B:
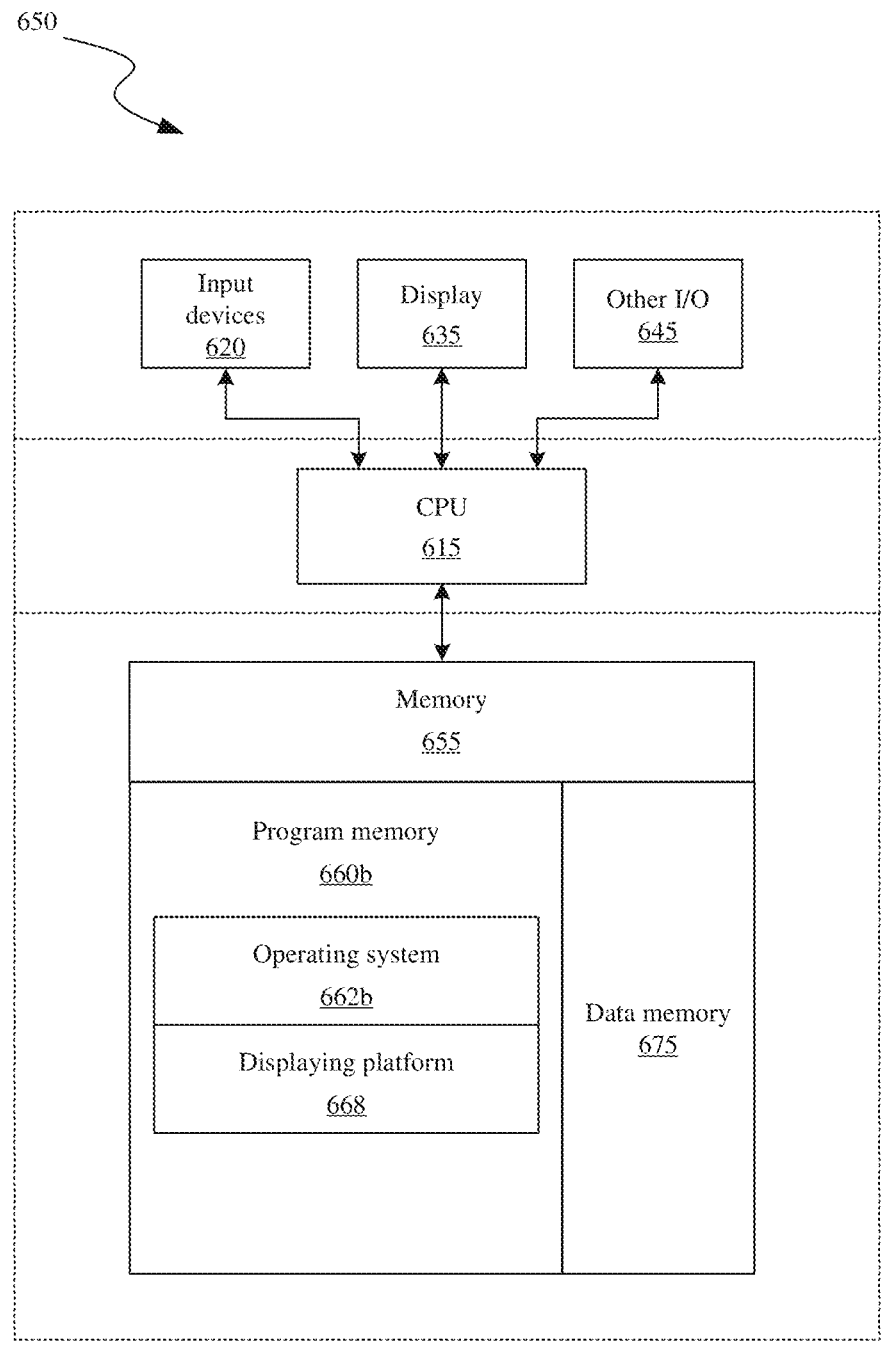

FIG. 6B is a block diagram illustrating an overview of devices on which some implementations of the customer service representative's computer can operate. The devices can comprise hardware components of a device 650, such as a customer service representative's computer that includes a displaying platform 668 that obtains a message from the call routing server and displaying in a GUI information from the message associated with the call from the user. Device 650 can include one or more input devices 625 that provide input to the CPU (processor) 615, notifying it of actions. The actions are typically mediated by a hardware controller that interprets the signals received from the input device and communicates the information to the CPU 615 using a communication protocol. Input devices 625 include, for example, a mouse, a keyboard, a touchscreen, an infrared sensor, a touchpad, a wearable input device, a camera- or image-based input device, a microphone, or other user input devices.

CPU 615 can be a single processing unit or multiple processing units in a device or distributed across multiple devices. CPU 615 can be coupled to other hardware devices, for example, with the use of a bus, such as a PCI bus or SCSI bus. The CPU 615 can communicate with a hardware controller for devices, such as for a display 635. Display 635 can be used to display text and graphics. In some examples, display 635 provides graphical and textual visual feedback to a person operating the device 650. In some implementations, display 635 includes the input device as part of the display, such as when the input device is a touchscreen or is equipped with an eye direction monitoring system. In some implementations, the display is separate from the input device. Examples of display devices are: an LCD display screen; an LED display screen; a projected, holographic, or augmented reality display (such as a heads-up display device or a head-mounted device); and so on. Other I/O devices 645 can also be coupled to the processor, such as a network card, video card, audio card, USB, FireWire or other external device, camera, printer, speakers, CD-ROM drive, DVD drive, disk drive, or Blu-Ray device.

In some implementations, the device 650 also includes a communication device capable of communicating wirelessly or wire-based with a network node (e.g., a call routing server) or with a user device (e.g., a laptop, desktop, or mobile device). The communication device can communicate with another device or a server through a network using, for example, TCP/IP protocols. Device 650 can utilize the communication device to distribute operations across multiple network devices.

The CPU 615 can have access to a memory 655. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 655 can include program memory 660b that stores programs and software, such as an operating system 662b and displaying platform 668. The displaying platform 664 may include processes or methods for receiving a message and displaying on a screen a list of telephone calls to be answered by the customer service representative as described in Sections I-VI and FIGS. 4-5 of this patent document. Thus, for example, the memory 655 may store instructions that upon execution by CPU 615 configure the device 650 to perform the operations described for the customer service representative's computer in FIGS. 4 and 5 and/or in the various embodiments described in this patent document. Memory 655 can also include data memory 675 that can include the information included in the message sent by the call routing server described in this patent document, which can be provided to the program memory 660b or any element of the device 650.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Those skilled in the art will appreciate that the components illustrated in FIG. 1-6B described above, and in each of the flow diagrams, may be altered in a variety of ways. For example, the order of the logic may be rearranged, sub-steps may be performed in parallel, illustrated logic may be omitted, other logic may be included, etc. In some implementations, one or more of the components described above can execute one or more of the processes described above.

Conclusion

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C.§ 112(f) will begin with the words "means for", but use of the term "for" in any other context is not intended to invoke treatment under 35 U.S.C.§ 112(f). Accordingly, the applicant reserves the right to pursue additional claims after filing this application to pursue such additional claim forms, in either this application or in a continuing application.

We claim:

1. A system, comprising:
a server configured to:
generate a plurality of sentiment scores associated with a plurality of topics, by:
analyzing each sentence in conversations between users and call representatives,
determining a sentiment sub-score for each sentence associated with at least one topic, and
combining the sentiment sub-score of each sentence to create a sentiment score associated with the at least one topic;
receive, from a user device, an indication of a topic selected via a telephone call, wherein the selected topic is one of the plurality of topics;
obtain a sentiment score associated with the selected topic from the generated plurality of sentiment scores;
identify one or more persons having personal compatibility to answer the telephone call in the selected topic,
wherein the one or more persons are identified based on a mapping between the one or more persons and the plurality of topics,
wherein the mapping between each person and at least one topic is based on an experience score that indicates a level of predicted performance or qualification of each person in the at least one topic and based on a performance score that characterizes each person's level of success in handling a telephone call in the at least one topic, and
send, to one or more computers associated with the one or more persons, one or more messages that indicates that the telephone call is mapped to the one or more persons, wherein the one or more messages indicate a recommendation for the one or more persons to answer the telephone call based on the sentiment score, and the experience score and the performance score for the mapping between the one or more persons and the selected topic;
each of the one or more computers configured to:
receive the message; and
display on a screen a list of telephone calls to be answered by a person, wherein the list of telephone calls includes the telephone call from the user device.

2. The system of claim 1,
wherein the list of telephone calls is organized in an order of one or more telephone calls recommended for the person to one or more telephone calls not recommended for the person, and
wherein the order is determined based on experience scores or performance scores related to mapping between the person and topics associated with the list of telephone calls.

3. The system of claim 1, wherein the performance score is determined based on an analysis of each person's speech attributes on a prior telephone call involving the selected topic.

4. The system of claim 1, wherein at least one telephone call in the displayed list of telephone calls is selectable.

5. The system of claim 1, further comprising:
the server configured to:
receive, from additional user devices, indications of the topic selected via a plurality of additional telephone calls;
determine that a number of telephone calls having the sentiment score associated with the selected topic exceeds a limit;
identify a plurality of persons available to answer the number of telephone calls,
wherein the number of telephone calls are randomly distributed among the plurality of persons regardless of the experience score or the performance score; and
send, to a plurality of computers associated with a plurality of persons, messages that indicates that the telephone call or at least one of the plurality of additional telephone calls is mapped to the plurality of persons.

6. The system of claim 1, further comprising:
at least one computer from the one or more computers configured to:
record a conversation between the person and a user of the user device;
send the conversation to the server;
the server further configured to:

receive and analyze the recorded conversation to determine a conversation score based on words used in the conversation, a tone of the conversation, a cadence of the conversation, or an amount of time of the conversation; and update the performance score for the person based on the conversation score.

7. The system of claim 6, wherein the conversation score is determined by analyzing a set of words from a beginning portion of the recorded conversation.

8. A method, comprising:
generating a plurality of sentiment scores associated with a plurality of topics, by:
analyzing each sentence in conversations between users and call representatives,
determining a sentiment sub-score of each sentence associated with at least one topic, and
combining the sentiment sub-score of each sentence to create a sentiment score associated with the at least one topic;
receiving, from a user device, an indication of a topic selected via a telephone call, wherein the selected topic is one of the plurality of topics;
obtaining a sentiment score associated with the selected topic from the generated plurality of sentiment scores;
identifying one or more persons having personal compatibility to answer the telephone call in the selected topic,
wherein the one or more persons are identified based on a mapping between the one or more persons and the plurality of topics,
wherein the mapping between each person and at least one topic is based on an experience score that indicates a level of predicted performance or qualification of each person in the at least one topic and based on a performance score that characterizes each person's level of success in handling a telephone call in the at least one topic; and
sending, to one or more computers associated with the one or more persons, one or more messages that indicates that the telephone call is mapped to the one or more persons,
wherein the one or more messages indicate a recommendation for the one or more persons to answer the telephone call based on the sentiment score, and the experience score and the performance score for the mapping between the one or more persons and the selected topic,
wherein a list of telephone calls to be answered by a person is configured to be displayed on each of the one or more computers, and
wherein the list of telephone calls includes the telephone call from the user device.

9. The method of claim 8,
wherein the list of telephone calls is organized in an order of one or more telephone calls recommended for the person to one or more telephone calls not recommended for the person, and
wherein the order is determined based on experience scores or performance scores related to mapping between the person and topics associated with the list of telephone calls.

10. The method of claim 8, wherein the performance score is determined based on an analysis of each person's speech attributes on a prior telephone call involving the selected topic.

11. The method of claim 8, wherein at least one telephone call in the displayed list of telephone calls is selectable.

12. The method of claim 8, further comprising:
receiving, from additional user devices, indications of the topic selected via a plurality of additional telephone calls;
determining that a number of telephone calls having the sentiment score associated with the selected topic exceeds a limit;
identifying a plurality of persons available to answer the number of telephone calls,
wherein the number of telephone calls are randomly distributed among the plurality of persons regardless of the experience score or the performance score; and
sending, to a plurality of computers associated with a plurality of persons, messages that indicates that the telephone call or at least one of the plurality of additional telephone calls is mapped to the plurality of persons.

13. The method of claim 8, further comprising:
receiving and analyzing a recorded conversation between the person and a user of the user device to determine a conversation score based on words used in the conversation, a tone of the conversation, a cadence of the conversation, or an amount of time of the conversation; and
updating the performance score for the person based on the conversation score.

14. The method of claim 13, wherein the conversation score is determined by analyzing a set of words from a beginning portion of the recorded conversation.

15. A non-transitory computer readable program storage medium having code stored thereon, the code, when executed by a processor, causing the processor to implement a method, comprising:
generating a plurality of sentiment scores associated with a plurality of topics, by:
analyzing each sentence in conversations between users and call representatives,
determining a sentiment sub-score for each sentence associated with at least one topic, and
combining the sentiment sub-score of each sentence to create a sentiment score associated with the at least one topic;
receiving, from a user device, an indication of a topic selected via a telephone call, wherein the selected topic is one of the plurality of topics;
obtaining a sentiment score associated with the selected topic from the generated plurality of sentiment scores;
identifying one or more persons having personal compatibility to answer the telephone call in the selected topic,
wherein the one or more persons are identified based on a mapping between the one or more persons and the plurality of topics,
wherein the mapping between each person and at least one topic is based on an experience score that indicates a level of predicted performance or qualification of each person in the at least one topic and based on a performance score that characterizes each person's level of success in handling a telephone call in the at least one topic; and
sending, to one or more computers associated with the one or more persons, one or more messages that indicates that the telephone call is mapped to the one or more persons,
wherein the one or more messages indicate a recommendation for the one or more persons to answer the telephone call based on the sentiment score, and the experience score and the performance score for the mapping between the one or more persons and the selected topic,
- wherein a list of telephone calls to be answered by a person is configured to be displayed on each of the one or more computers, and
- wherein the list of telephone calls includes the telephone call from the user device.

16. The non-transitory computer readable program storage medium of claim 15,
- wherein the list of telephone calls is organized in an order of one or more telephone calls recommended for the person to one or more telephone calls not recommended for the person, and
- wherein the order is determined based on experience scores or performance scores related to mapping between the person and topics associated with the list of telephone calls.

17. The non-transitory computer readable program storage medium of claim 15, wherein the performance score is determined based on an analysis of each person's speech attributes on a prior telephone call involving the selected topic.

18. The non-transitory computer readable program storage medium of claim 15, wherein at least one telephone call in the displayed list of telephone calls is selectable.

19. The non-transitory computer readable program storage medium of claim 15, wherein the method further comprises:
- receiving, from additional user devices, indications of the topic selected via a plurality of additional telephone calls;
- determining that a number of telephone calls having the sentiment score associated with the selected topic exceeds a limit;
- identifying a plurality of persons available to answer the number of telephone calls,
  - wherein the number of telephone calls are randomly distributed among the plurality of persons regardless of the experience score or the performance score; and
- sending, to a plurality of computers associated with a plurality of persons, messages that indicates that the telephone call or at least one of the plurality of additional telephone calls is mapped to the plurality of persons.

20. The non-transitory computer readable program storage medium of claim 15, wherein the method further comprises:
- receiving and analyzing a recorded conversation between the person and a user of the user device to determine a conversation score based on words used in the conversation, a tone of the conversation, a cadence of the conversation, or an amount of time of the conversation; and
- updating the performance score for the person based on the conversation score.

* * * * *